J. B. SLAWSON.

Improvement in Fare Boxes.

No. 4,850. Reissued April 2, 1872.

*Witnesses:*
A. McCallum
D. G. Stuart

*Inventor:*
J. B. Slawson
by his Atty P. Hannay

AM. PHOTO-LITHOGRAPHIC CO. N.Y. (OSBORNE'S PROCESS.)

UNITED STATES PATENT OFFICE.

JOHN B. SLAWSON, OF NEW YORK, N. Y.

IMPROVEMENT IN FARE-BOXES.

Specification forming part of Letters Patent No. 57,000, dated August 7, 1866; reissue No. 4,850, dated April 2, 1872.

*To all whom it may concern:*

Be it known that I, JOHN B. SLAWSON, formerly of New Orleans, in the State of Louisiana, now of the city, county, and State of New York, have invented a new and improved box for the collection of passengers' fares in public conveyances, such as street-cars, omnibuses, &c., of which the following is a specification, reference being had to the accompanying drawing, in which—

Figure 1:
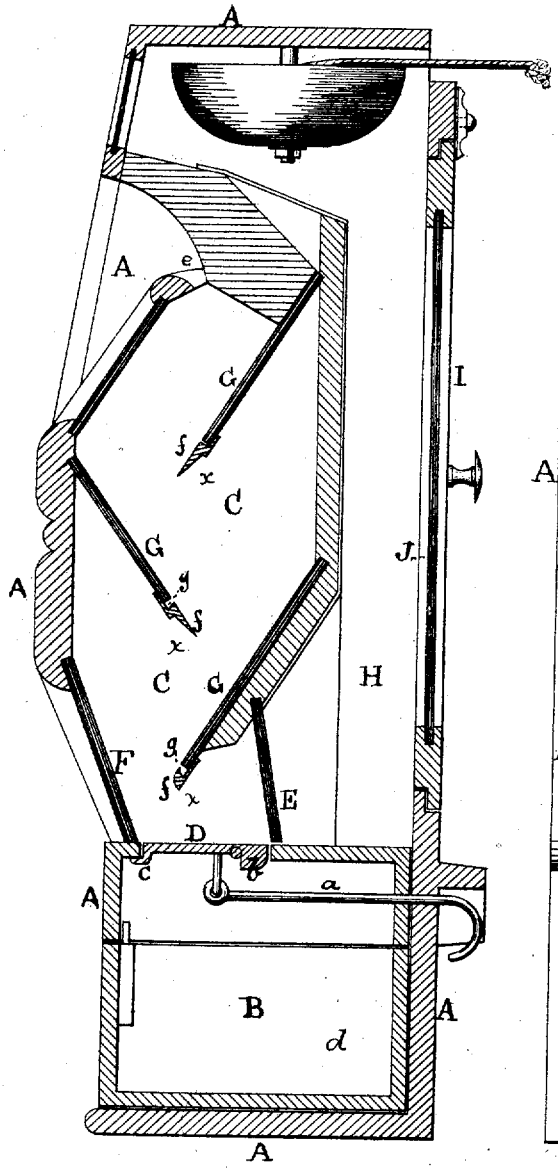
Figure 2:
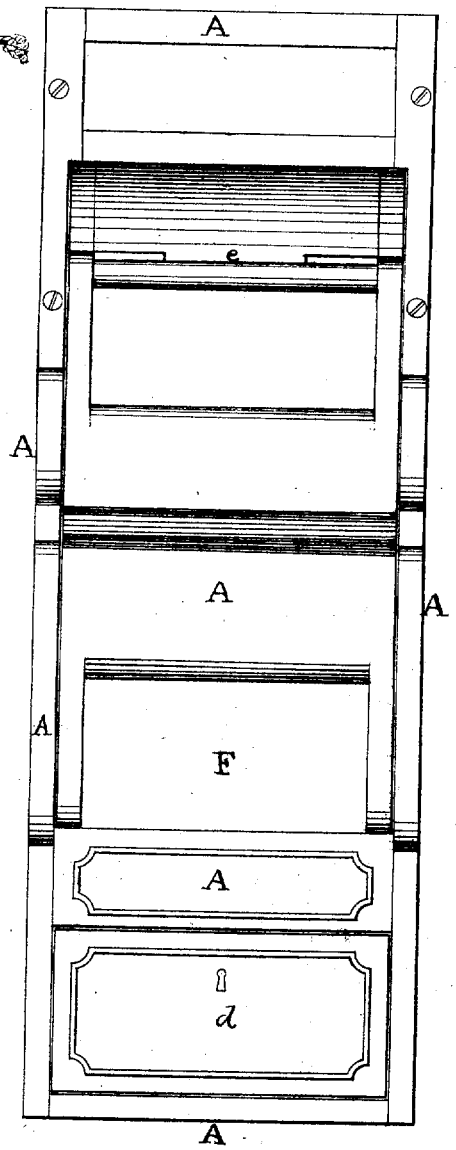

Figure 1 represents a vertical section from front to rear through a box having my improvements applied thereto; and Fig. 2, a front elevation of the same.

My invention relates to certain improvements in the construction of passenger-fare boxes, whereby, in addition to coin and tickets, the reception of currency in payment of fare is rendered practicable without rendering the fare more liable to be extracted through the mouth when once deposited in the box, and temporarily arrested for inspection by the driver, or the passengers, or both. My invention for this purpose consists in providing the throat or channel that leads to the apron, on which the fare is arrested for inspection, with a series of two or more guide-plates or slides, arranged in such manner between the mouth and apron that while they may be firmly secured, both at the sides and top to the walls of the box or channel, the lower end or edge of each must be projected into the channel, so as to leave an open space immediately beneath said end or edge, substantially as shown in Fig. 1—that is to say, so that the lower end of each slide shall constitute a projecting edge in the channel or throat. Again, these slides must be arranged successively, the one above the other, and so as to project downward, with the adjacent ones running in opposite directions, and at suitable distances apart, that the fare on being passed into the box through the enlarged mouth may drop upon and slide down the first, and by it be precipitated upon the second slide, and thence down the latter where three are used, upon the third, its direction being changed each time it falls upon a slide, until it is deposited on the arresting-apron below, where it is inspected by the driver through an opening covered by a transparent medium arranged in the rear side of the box for that purpose, and if found correct, then passed into the receiving chamber or drawer below by simply tilting the arresting-apron. My invention further consists in combining with the slides or guide-plates above referred to certain other devices for the purpose of increasing the difficulty of extracting the fare when once deposited in the box.

To enable those skilled in the art to make, construct, and use my improved fare-box, I will now proceed to describe it in detail, omitting a particular description of such parts as are unnecessary to a full understanding of my present improvement.

The frame or casing A of the box may be made of any suitable size, form, and material. The completed box to which my improvement is represented as being applied, like the box patented to me on the 28th day of July, 1857, is provided with two main chambers, B and C, the lower B of which constitutes the general receiving-chamber of all the fares, they, before being passed into it, being first inspected individually as deposited in the chamber C above; for which purpose the two chambers are partitioned from each other by a movable platform, D. On this platform or apron the fare is arrested on being passed into the box; in this position it is kept until examined by the driver, and if desired by the passengers, for which purpose two openings, covered by transparent mediums, E and F, are framed in the box; the one, E, in rear for the driver to look through, and the other, F, in front for the passengers. The fare having been inspected and found correct, the driver then passes it into the chamber B below by tilting the apron D, which he does by pulling the rod *a* which extends through the rear of the box within convenient reach of his hand. In this case the apron is hinged or pivoted to the sides of the box, and is weighted on its rear end, so that on being released by the driver the weighted end *b* of the apron will descend until arrested by a lip, *c*, formed on its other end, which, coming in contact with the under side of the upper side of the chamber B at the point of communication between the latter and the upper chamber C, arrests its further descent. By this arrangement the apron is made self-acting so far as closing the communication between the two chambers is concerned, and for the same reason self-adjusting to arrest the next fare as deposited for inspection. To facilitate the removal of the accumulated fare from the box after the travel of the day is over, the chamber B is provided with a drawer, *d*, into which the fare drops. This drawer, when the box is in actual use for the collection of the fare, is kept securely locked, the key being kept by the party whose duty it is to remove the fare from the box. In my patent of 1857, before referred to, the box was provided with a mouth for the reception of the fare of a size just sufficient readily to receive coin or tickets; this precluded the easy passage of currency. In my present improved box, however, the mouth is much enlarged to allow of the ready passage of currency, and is arranged in the box at a considerable distance above the arresting-apron D, and in the side of the box facing the passengers. The placing of the mouth *e* so much above the apron D has for its object the arrangement of certain devices, whereby, while the passage of the fare to the arresting-apron is facilitated, its abstraction, when once deposited there, is rendered practically impossible, notwithstanding that the enlarged mouth would seem to have increased its liability to be abstracted. The mouth *e* opens directly into the upper part of the inspecting-chamber C, and has between it and the apron D a series of two or more slides or guide-plates, G, (three being deemed the preferable number, and as such so illustrated in the drawing,) so arranged that while firmly secured to the walls of the box at their sides, or at the top, or both, the lower end or edge of each shall project into the chamber so as to leave an open space immediately below said end or edge, substantially as shown at *x*, Fig. 1—or, in other words, so that the lower end of each slide shall constitute a projecting edge in the channel or throat which forms the upper part of the chamber C. By reference to Fig. 1 of the drawing it will be seen that these slides are arranged successively one above the other, and so that the upper one shall project downward in a direction toward the next below it, while the latter projects downward in the opposite direction, or toward the one next below it where three are used, in which case the third runs counter to the second, they being in each case arranged at suitable distances apart, that the fare on being passed into the box through the mouth, whether in currency, coin, or tickets, may drop upon and slide down the first, and by it be precipitated upon the second, and thence down the latter upon the tilting-apron below, or what is beemed better upon a third, and thence upon the apron D. When the fare reaches the apron D it becomes the duty of the driver or conductor, as the case may be, to inspect it, and if correct pass it into the chamber B below, as before described. The slides G I prefer to make of thick glass, and with a sharp or angular edge on their lower end. By making them of glass they do not obstruct the light in its passage to the interior of the box, and are sufficiently strong for all practical purposes. In making them of glass, as their lower end is made sharp and consequently liable to be broken by the dropping in of coin upon them, I form their lower edge of a metallic strip or plate, *f*, and secure its ends to the sides of the box. By making the lower end of the slides with a sharp edge, it will serve as a means of stripping or detaching the fare from any unlawful means that may be used to extract it through the mouth of the box. As an additional security, where elastic sticks or strips of wood, whalebone, or metal are used, a groove or recess, *g*, is formed in the upper side of the slides near their lower end and running parallel with their edge. In endeavoring to pass the stick or other elastic strip down over the slides to reach the fare below, the end will be caught in the recess and its further descent arrested. H represents a chamber, provided with a door, I, having a glass light, J, through which the driver in examining the fare has to look as well as through the transparent medium E.

Having thus described my invention, what I claim as new, and desire to secure by Letters Patent, is—

1. The combination in a fare-box of the following instrumentalities, to wit: An opening or mouth, *e*, through which the passengers may deposit their fare in the box; two or more slides, G, arranged to project into the upper part of the examining-chamber C in the manner described, for the purpose of preventing the abstraction of the fare; a movable receiving-apron, D, on which the fare, as deposited by the passengers, can be temporarily arrested for inspection; and an opening, E, covered or protected by a transparent medium, through which the driver or conductor can examine the fare when so arrested, substantially as set forth.

2. The combination in a fare-box of the following instrumentalities, to wit: An opening or mouth, *e*, through which the passengers may deposit their fare in the box; two or more slides, G, arranged to project into the upper part of the examining-chamber C in the manner described, for the purpose of preventing the abstraction of the fare; a movable receiving-apron, D, on which the fare, as deposited by the passengers, can be temporarily arrested for inspection; and an opening, E, covered or protected by a transparent medium, through which the passengers can examine the fare when so arrested, substantially as set forth.

3. The combination in a fare-box of two or more slides, G, arranged as described, when provided with a knife or cutting-edge at their lower end, in the manner and for the purpose set forth.

4. A slide or slides, G, provided with a recess, *g*, in the manner and for the purpose set set forth.

5. In combination with a glass slide, G, I claim the metallic edge or strip *f*, for the purpose set forth.

Witnesses: J. B. SLAWSON.

P. HANNAY,

A. McCALLUM.